United States Patent [19]

Rubel et al.

[11] Patent Number: 5,634,605
[45] Date of Patent: Jun. 3, 1997

[54] MOUNTING CLAMP FOR TRANSPORT GENERATOR SET

[75] Inventors: Victor T. Rubel, Manlius; Thomas A. Anderson, Jordan; Tommy L. Gaubatz, Liverpool; Kitt N. Warren, Deruyter; Vito C. Fleming, Parish; Vincent P. Fecteau, E. Syracuse, all of N.Y.

[73] Assignee: Carrier Corporation, Syracuse, N.Y.

[21] Appl. No.: 522,816

[22] Filed: Sep. 1, 1995

[51] Int. Cl.⁶ .................................................. A47B 96/06
[52] U.S. Cl. ............................................................. 248/228.1
[58] Field of Search .......................... 248/228.1, 228.4, 248/228.5, 316.1, 316.6, 229.14, 229.13, 229.2, 229.22, 229.23, 229.24, 674, 675

[56] References Cited

U.S. PATENT DOCUMENTS

| | | | |
|---|---|---|---|
| 1,786,004 | 12/1930 | Clayton | 248/228.5 |
| 3,288,409 | 11/1966 | Bethea, Jr. | 248/316.6 X |
| 4,823,752 | 4/1989 | Uuskallio | 248/316.6 X |
| 4,834,401 | 5/1989 | Harrington et al. | 248/228.1 X |
| 5,104,079 | 4/1992 | Hardtke | 248/228.5 |
| 5,292,096 | 3/1994 | Bodenheimer | 248/228.5 |

*Primary Examiner*—Ramon O. Ramirez

[57] ABSTRACT

A clamp (10) for mounting a packaged engine-driven electrical generator, or generator set (70), to a transport trailer (80). The clamp has two major components, a frame member (12) and a clamp member (13), both generally L-shaped. The base (21) of the frame member is securely attached to a frame member (72, 73) of the generator set. The base (31) of the clamp member extends through a fulcrum slot (25) in the frame member. When in the engaged position, a nut (14) and bolt (15) connect the frame member riser and clamp member riser. The clamp engages the flange of an I beam 81, part of the chassis of the trailer, between the base portion of the frame member and the toe (34) of the clamp member. Tightening the nut and bolt causes the clamp to clamp securely to the I beam. An alignment guide (23) assists in correcting minor misalignments as the generator set is raised into position and also prevents inadvertent and premature movement of the clamp from its disengaged to its engaged position during positioning of the generator set. The bolt is oriented horizontally when the clamp is in its engaged position so that it is readily accessible for tightening and loosening using a power tool.

11 Claims, 6 Drawing Sheets

MOUNTING CLAMP FOR TRANSPORT GENERATOR SET

BACKGROUND OF THE INVENTION

This invention relates generally to the field of transport refrigeration. More particularly the invention relates to a clamp for mounting a packaged engine-driven electrical generator, or generator set, on a road trailer configured to haul transport containers.

Refrigerated containers are commonly used to transport perishable goods from place to place. Such containers are used in intermodal transportation arrangements, with the containers suitable for loading and transport on ships, trains and truck trailers. The refrigeration systems in such containers require a source of electrical power for operation. When at a freight terminal, a refrigerated container receives electrical power through a connection to a conventional source of electrical power. When in a ship, a refrigerated container receives electrical power from the ship's electrical system. When being transported by road, a refrigerated container must be supplied with electrical power from a portable source. This portable source is commonly a generator set.

One type of generator set is mounted on the trailer by hanging it from the I beams that form part of the chassis of the trailer. It is not economical nor practical to have every container trailer fitted with a generator set nor to have container trailers that are dedicated to hauling only refrigerated containers. Rather, the practice in the industry is to have demountable generator sets that can be installed on a trailer at the same time that it receives a refrigerated container. A generator set is removed from a trailer when the trailer is idle or hauling a nonrefrigerated container.

A generator set is usually mounted by an arrangement of clamps that hold the set to the I beams of the trailer. The clamps must hold the generator set securely to the I beams. Certain important dimensions may vary from trailer to trailer. The widths and thicknesses of the flanges in the I beams that form the main part of the trailer may vary. In addition, the distance between the centerlines of the two I beams used for mounting the generator set may be either 91.4 centimeters (36 inches) or 96.5 centimeters (38 inches). A clamping system must be able to accommodate these dimensional variations.

Prior art clamping systems have as many as 12 vertically oriented bolts that must be tightened to secure a generator set to a trailer. Some prior art clamping systems require that the generator set be placed in position below the trailer with precision before the clamps can be properly made up around the trailer I beams. In the limited clearances and cramped conditions in and around a generator set in place under a trailer chassis, it can be awkward and time consuming to secure a large number of bolts, especially if the bolts are vertically oriented. The limited clearances may make it impossible to use power tools on the vertically oriented clamp bolts. Prior art clamps can make securing a generator set to a trailer a one half man-hour job or more.

What is needed is a clamp for mounting a transport generator set that minimizes the requirement for precision placement of a generator set on a trailer, can accommodate variations in chassis I beam spacing and dimensions, can be quickly made up and secured easily with power tools.

SUMMARY OF THE INVENTION

The present invention is a clamp having only one horizontally oriented bolt. A single generator set requires four of the clamps for a complete clamping installation so that only four bolts must be tightened to mount the generator set on a trailer. The horizontal orientation of the bolt makes for the easy use of a power tool to tighten or loosen a clamp. This feature, plus the small total number of bolts reduce the time required to mount or demount a generator set on a container trailer. The clamp can be used on trailers that have variations in the distance between I beams and in the sizes of the I beam flange. The clamp serves as an alignment aid in positioning the generator set when mounting.

The clamp comprises two major components, a clamp frame member securely mounted, as for example by welding, to the frame of the generator set and a generally L-shaped angle clamp member. The clamp also has a bolt, a nut and variable angle beating means, for example a spherical washer set. The variable angle beating means allows the bolt to be horizontal when the clamp is its engaged position regardless of the thickness of the I beam flanges and spacing on the particular trailer. When the clamp is engaged and the bolt is made up and horizontal, the bolt is solely under axial tensile stress.

The clamp frame member has an alignment guide that can correct minor misalignments in the position of the clamps with respect to the trailer I beam frames as the generator set is raised into position under the trailer. The alignment guide also serves to prevent unintended movement of the angle clamp member out of its disengaged position while the generator set is raised into position.

Except for disassembly for repairs or replacement, there is no need to remove the nut and bolt from the clamp. With the nut and bolt installed on the clamp, the angle clamp member cannot be separated from the clamp frame member and become lost.

The clamp of the present invention enables a single installer using power tools, such as a fork lift and a pneumatic wrench, to install and secure a generator set to a container trailer in ten minutes or less.

BRIEF DESCRIPTION OF THE DRAWINGS

The accompanying drawings form a part of the specification. Throughout the drawings, like reference numbers identify like elements.

DESCRIPTION OF THE PREFERRED EMBODIMENT

Figure 1:
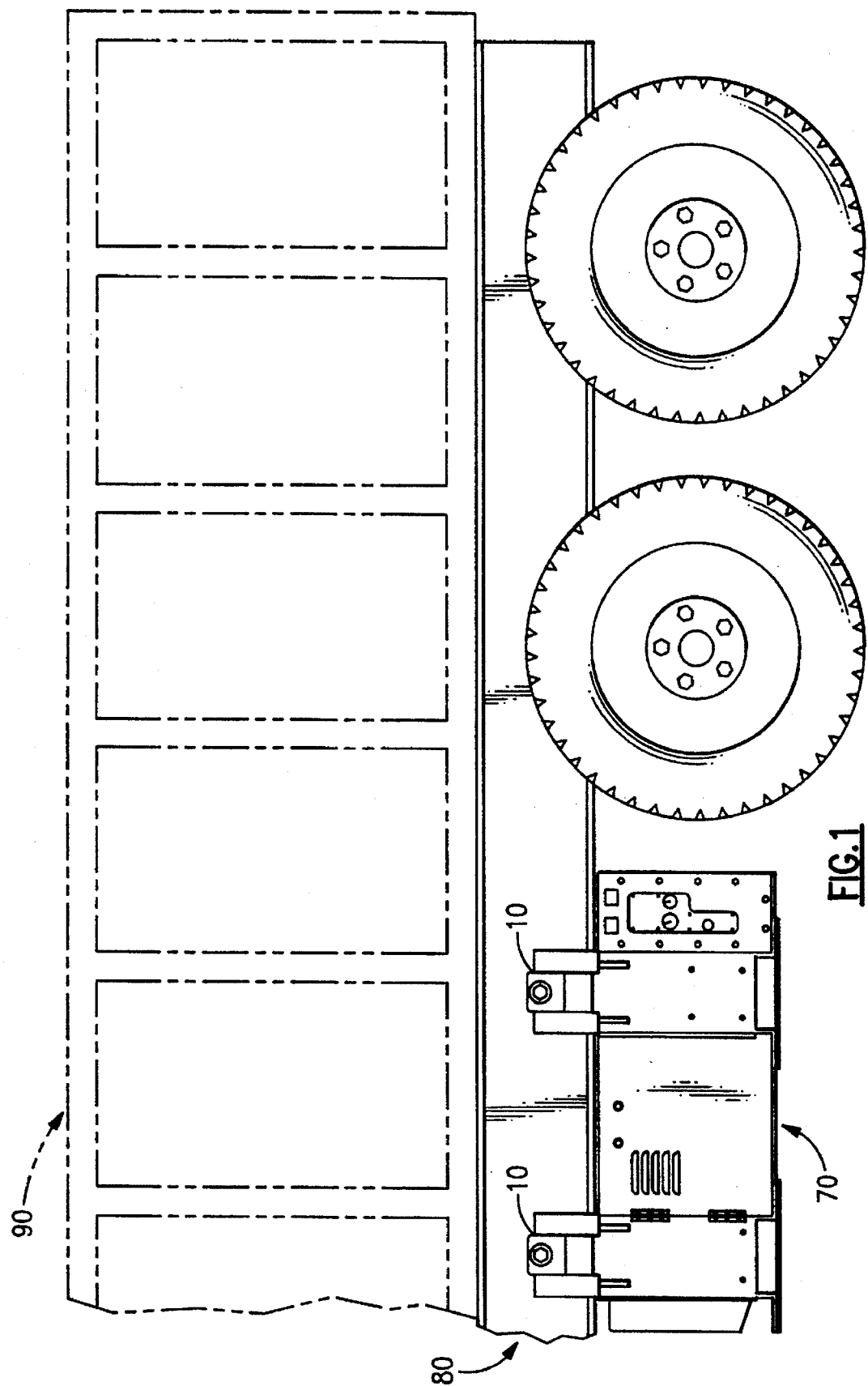
FIG. 1 is a view of a transport generator set mounted to the chassis of a container trailer using the clamps of the present invention.

FIG. 1 shows container transport trailer 80 with, in phantom, refrigerated container 90 loaded. Mounted to trailer 80 is generator set 70. A first pair of clamps 10 of the present invention secure one side of generator set 70 to trailer 80. A second pair of clamps (not shown in FIG. 1) secure the other side of generator set to the trailer to complete the mounting.

Figure 2:
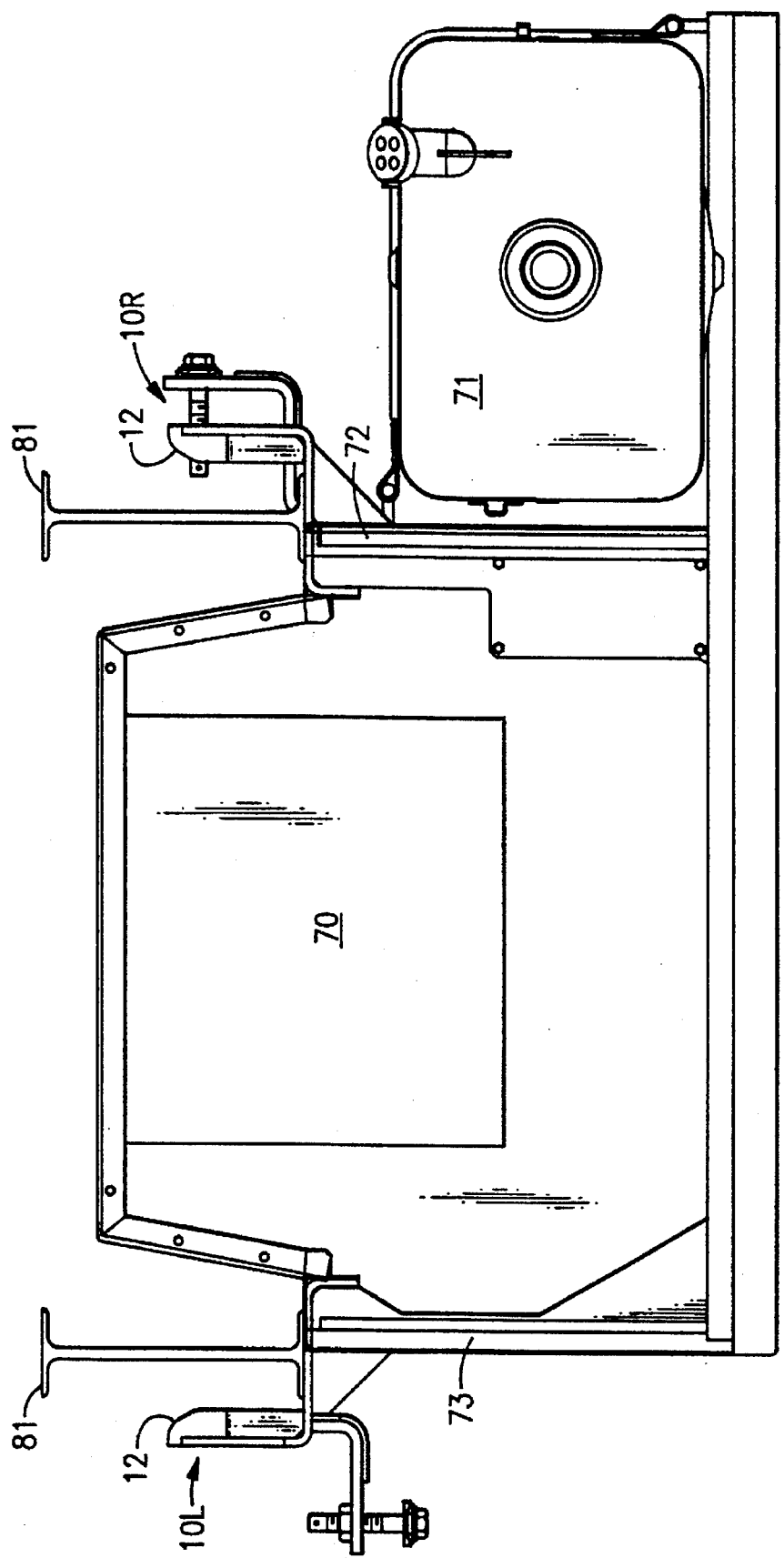
FIG. 2 is a view of a transport generator set having the clamps of the present invention being mounted to a container trailer chassis.

FIG. 2 shows another view of generator set 70, here being mounted to I beams 81 of the chassis of a container trailer. This view shows fuel tank 71 of generator set 70. Clamp 10R is in its engaged position, in which the clamp secures the set to I beam 81. Clamp 10L is in its disengaged position. A clamp is in its disengaged position, for example, while the generator set is being positioned for mounting on a trailer. Clamps 10R and 10L are respectively securely attached to frame members 72 and 73 of generator set 70 by, for example, welding or bolts and nuts.

Figure 3:
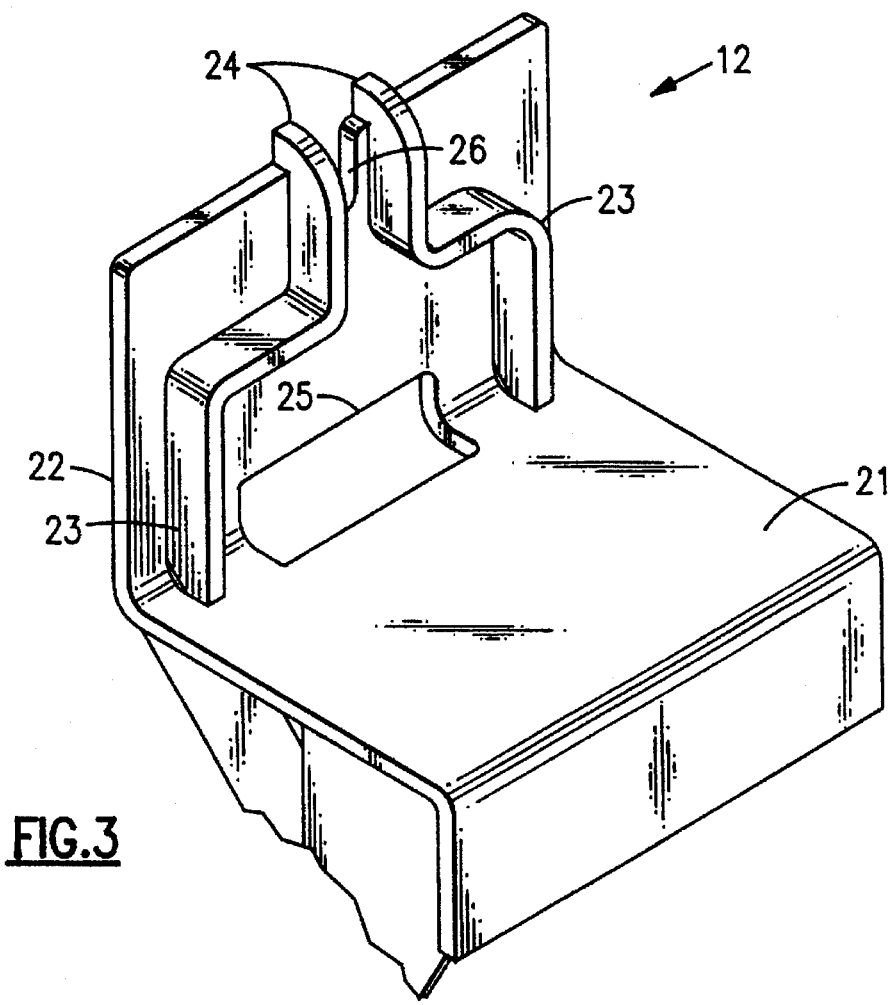
FIG. 3 is an isometric view of the clamp frame member of the clamp of the present invention.

FIG. 3 shows frame member 12 of clamp 10. Frame member 12 has lower, horizontal base 21 and vertical riser 22. Projecting from the face of riser 22 is alignment guide 23. Extending into both base 21 and riser 22 is fulcrum slot 25. At the top of alignment guide 23 are nut retainers 24. Extending into and through the top of riser 22 is bolt slot 26.

Figure 4:
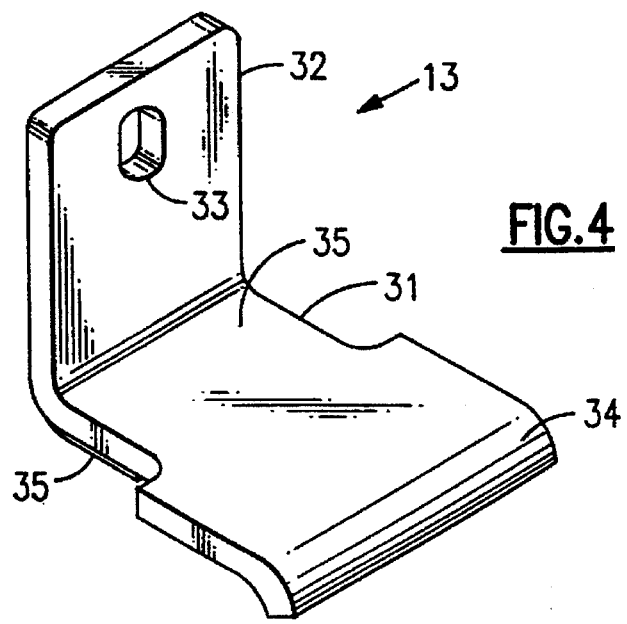
FIG. 4 is an isometric view of the angle clamp member of the clamp of the present invention.

FIG. 4 shows clamp member 13 of clamp 10. Clamp member 13 has base 31 and riser 32. Elongated bolt hole 33 extends through riser 32. Base 31 has curved toe 34 and heel 35, with toe 34 being wider than heel 35.

Figure 5:
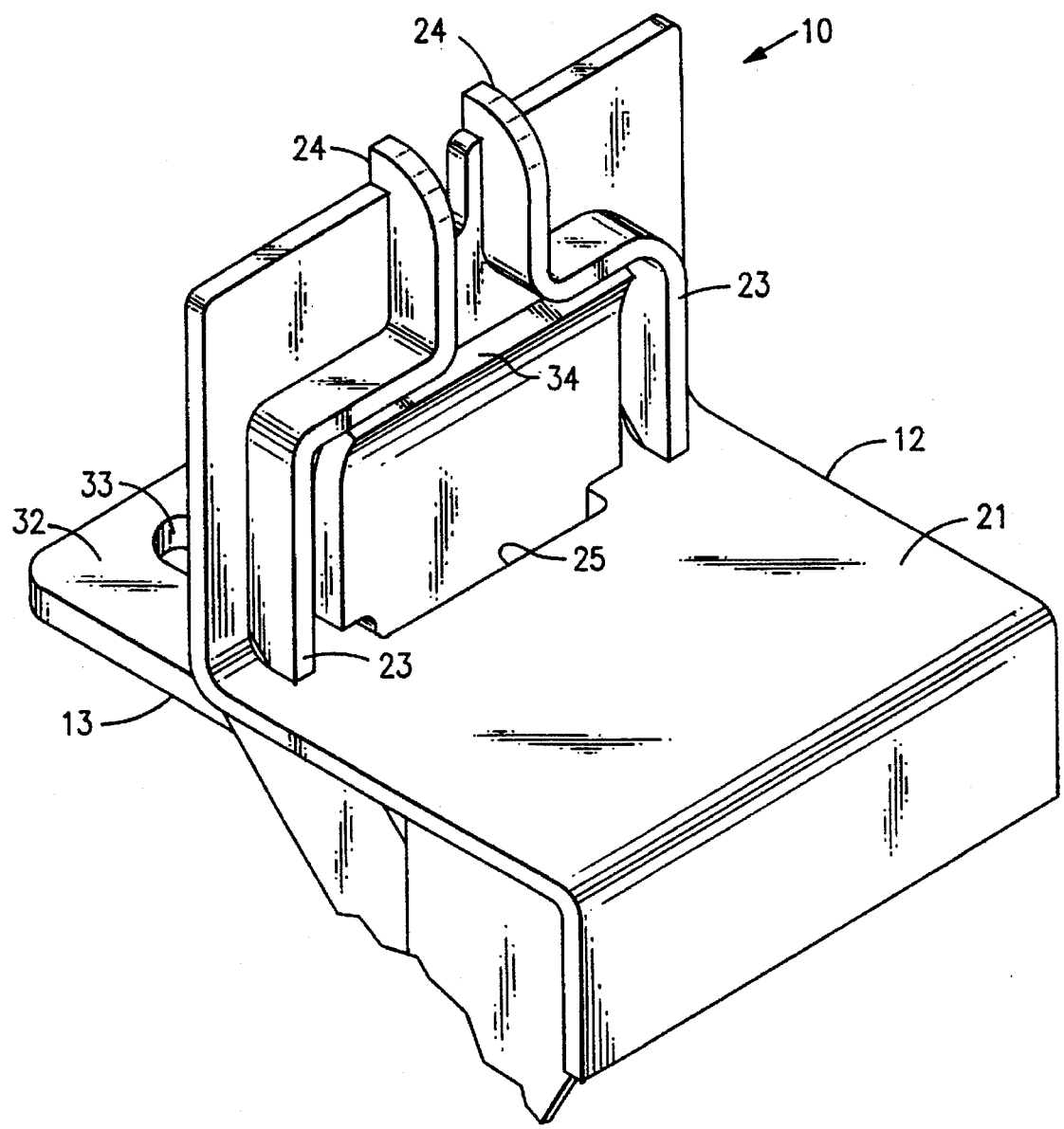
FIG. 5 is an isometric view of the clamp of the present invention in its disengaged invention.

As can be seen in FIG. 5, when clamp 10 is in its disengaged position, toe 34 is housed in and does not extend beyond alignment guide 23. Because toe 34 is wider than fulcrum slot 25, clamp member 13 can only be separated from frame member 12 by withdrawing first base 31 and then riser 32 through fulcrum slot 25. If there is a bolt, secured by a nut, passing through elongated hole 33 as described below, it is not possible to withdraw riser 32 through fulcrum slot 25. Therefore, as long as there is a bolt through hole 33, clamp member 13 cannot become separated from frame member 12 and become lost.

As generator set 70 (FIG. 2) is raised into position under trailer 80 (FIG. 2) as, for example by a fork lift, the clamps on the set may not be precisely aligned with the I beams that will support the set when installed. Referring again to FIG. 5, the convex curvature of the faces of nut retainers 24 the top of alignment guide 23 allows the guide to correct minor misalignments by causing the generator set to shift position on the fork lift as the set is raised into position. Alignment guide 23 prevents contact between toe 34 and the I beam as the generator set is raised into position thus preventing premature movement of the clamp from its disengaged to its engaged position.

Figure 6:
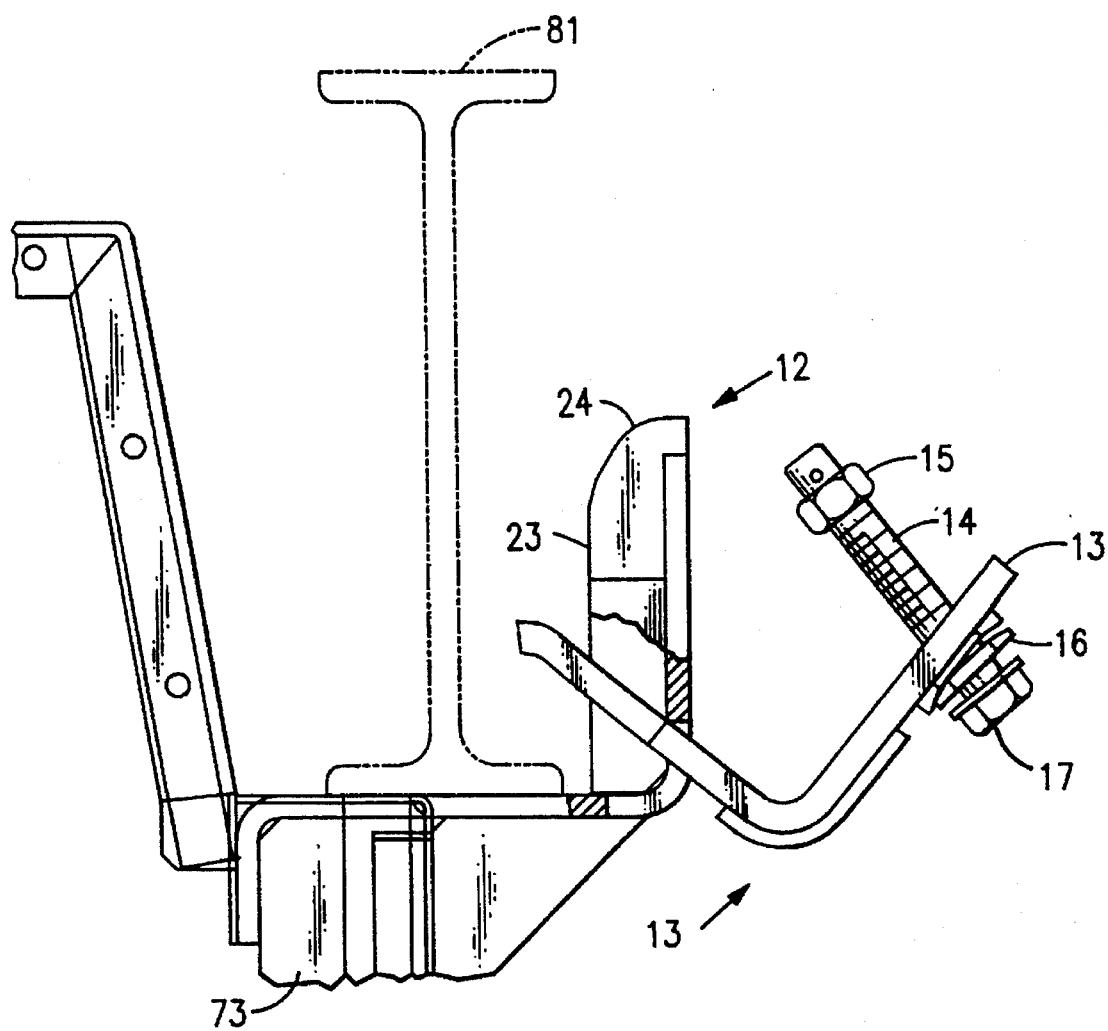
FIG. 6 is a partially sectioned side view of the clamp of the present invention while in a position intermediate its engaged and disengaged position.

FIG. 6 shows clamp 10 in an intermediate position between its disengaged and engaged positions. The figure also shows bolt 14 and nut 15 as well as spherical washer set 16 installed on clamp member 13. Spherical washer set 16 is placed on bolt 14 between bolt head 17 and clamp member riser 32. Because hole 33 (FIG. 4) is elongated, it allows bolt 14 to be positioned at some orientation other than perpendicular to the face of frame riser 32. As the installer moves clamp member 13 from the disengaged to the engaged position, he raises nut 15 over the top of alignment guide 23 and between nut retainers 24, with bolt 14 then resting in bolt slot 26. When nut 15 is between nut retainers 24, it cannot rotate. The installer can then use a single wrench to tighten the bolt and nut, securing the clamp to the I beam. Bolt 14 and nut 15 need not be removed from clamp member 13 to engage or disengage the clamp. The only reason, therefore, for removing the bolt and nut is to disassemble or repair the clamp.

Figure 7A:
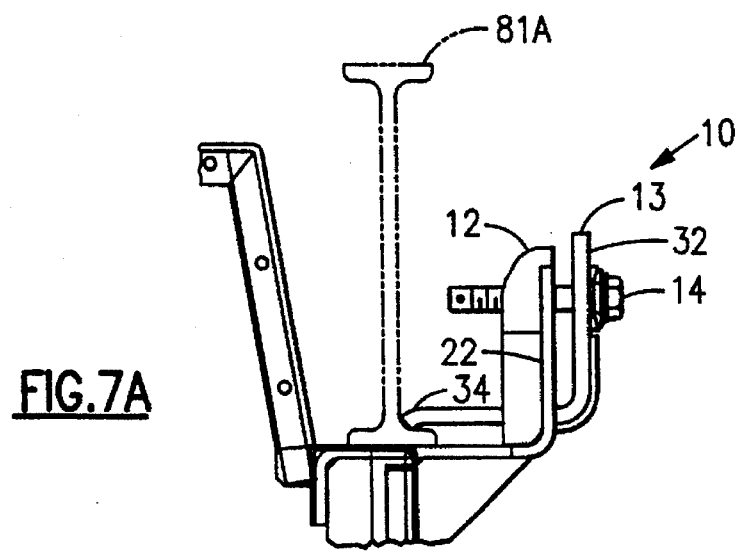
FIGS. 7A, 7B and 7C are views of the clamp of the present invention in its engaged position that illustrate the ability of the clamp of the present invention to accommodate trailer chassis I beams of different dimensions and spacings.
Figure 7B:
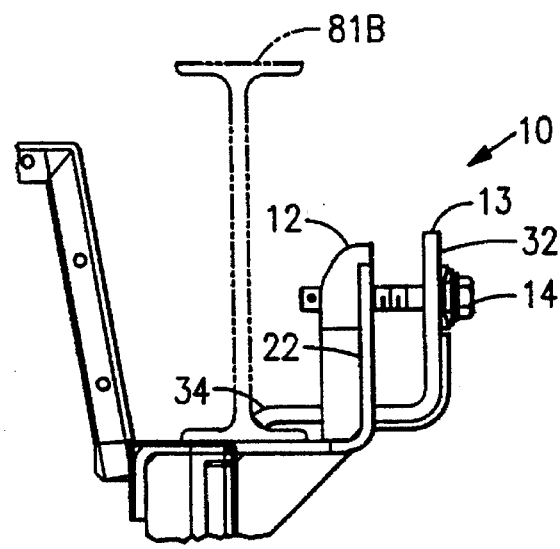
Figure 7C:
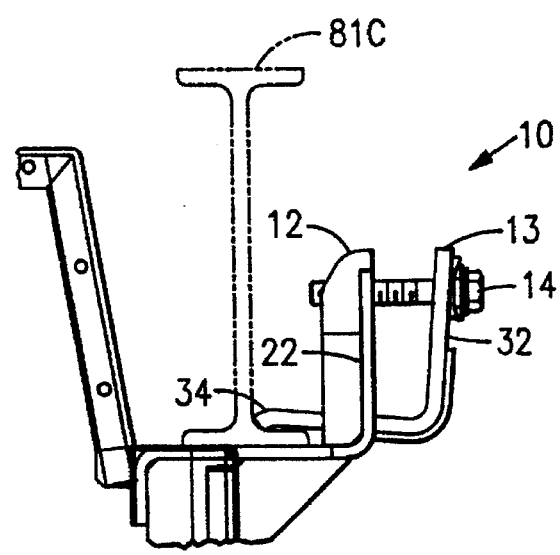

Clamp 10 can accommodate variations in trailer I beam spacings and I beam flange dimensions. FIG. 7A shows clamp 10 secured to I beam 81A. I beam 81A has a narrow and thin flange and is part of the chassis of trailer having narrow (91.4 centimeter/36 inch) I beam spacing. FIG. 7B shows clamp 10 secured to I beam 81B. I beam 81B has a wide and thin flange and is part of the chassis of a trailer having wide (96.5 centimeter/38 inch) I beam spacing. In both cases, toe 34 of angle clamp member 13 is able to engage securely the I beam near the flange root. When the flange of the I beam is thin, riser members 22 and 32 are parallel or nearly so when clamp 10 is engaged and bolt 14 is tightened. In both configurations, bolt 14 is subjected only to axial tensile stress. FIG. 7C shows clamp 10 secured to I beam 81C. I beam 81C has a wide and thick flange and is part of the chassis of a trailer having wide I beam spacing. Toe 34 is still able to engage securely the I beam near the flange root. In this configuration, frame riser 22 and clamp member riser 32 are not parallel when clamp 10 is engaged and bolt 14 tightened. Because of spherical washer set 16, however, bolt 14 can still remain horizontal and is still subjected only to axial tensile stress.

A typical generator set would have four clamps 10 fitted to its frame. Installation of such a generator set on a container trailer can be accomplished in as little as five minutes.

We claim:

1. A clamp (10) for mounting a transport generator set (70) to a frame member (81) of a transport trailer (80) comprising:

a frame member (12) having
        a frame base (21) for integrally interfacing said generator set and providing an attachment therewith,
        a frame riser (22) that extends from said frame base and
        a fulcrum slot (25) through said riser;

an L-shaped clamp member (13) having
        a clamp base (31) that extends through said fulcrum slot and
        a clamp riser (32) that extends from said clamp member base; and means, connecting said clamp riser and said frame riser, for urging said clamp riser toward said frame riser so that, through lever action between said clamp member and said fulcrum slot, said clamp base is urged toward said frame base thereby securing said clamp to said frame member of said trailer that is positioned between said frame base and said clamp base.

2. The clamp of claim 1 in which there is a bolt slot (26) formed in a distal end of said frame riser;

there is a hole (33) formed in and extending through said clamp riser; and said urging means comprise a bolt (14) extending through said hole and said bolt slot with a nut (15) threadably mounted on said bolt.

3. The clamp of claim 2 in which said hole is elongate.

4. The clamp of claim 3 in which said bolt has a head (17) and further comprising variable angle being surface means between said clamp riser and said bolt head.

5. The clamp of claim 4 in which said variable angle bearing surface means is a spherical washer set.

6. The clamp of claim 1 in which said fulcrum slot extends through both said frame base and said frame riser;

said clamp base has
        a distal toe (34) and a proximal heel (35); and said fulcrum slot, said distal toe and said proximal heel have lateral widths and said fulcrum slot lateral width is less than the said distal toe lateral width and greater than said proximal heel lateral width so that, of said heel and toe, only said heel may pass through said fulcrum slot.

7. The clamp of claim 2 further comprising an alignment guide (23) extending from a face of said frame riser.

8. The clamp of claim 7 in which said alignment guide is configured so that said clamp base distal toe may be recessed into said alignment guide when said clamp is in a disengaged position.

9. The clamp of claim 7 in which said alignment guide comprises two sections, each section having a nut retainer (24) in a distal end of said section with said nut retainers spaced from each other so as to prevent rotation of a nut placed between them.

10. The clamp of claim 9 in which each said nut retainer has a convexly curved face.

11. An improved generator set (70) for a transport trailer (80), said generator set having an engine-driven electrical generator mounted on a frame capable of being mounted and demounted from said trailer, in which the improvement comprises mounting clamps (10) affixed to and projecting upward from said frame with each said clamp having:

a frame member (12) having
  a frame base (21),
  a frame riser (22),
  a fulcrum slot (25) formed in and extending through said frame riser and
  a bolt slot (26) formed in a distal end of said frame riser;

a clamp member (13) having
  a clamp base (31) that extends through said fulcrum slot,
  a clamp riser (32) that extends from said clamp member
  a hole (33) formed in and extending through said clamp member riser and
  a bolt (14), having a bolt head (17), extending through said hole and said bolt slot with a nut (15) threadably mounted on said bolt so that when said bolt is rotated to draw said nut toward said bolt head, said clamp riser is urged toward said frame riser and, through lever action between said clamp member and said fulcrum slot, said clamp base is urged toward said frame base thereby securing said clamp to a frame member (81) of said trailer that is positioned between said frame base and said clamp base.

* * * * *